US012156009B2

(12) United States Patent
Lin

(10) Patent No.: US 12,156,009 B2
(45) Date of Patent: Nov. 26, 2024

(54) VIBRATION UNIT, SPEAKER AND MANUFACTURING METHOD OF THE VIBRATION UNIT

(71) Applicant: Ming-Hung Lin, Guangdong (TW)

(72) Inventor: Ming-Hung Lin, Guangdong (TW)

( * ) Notice: Subject to any disclaimer, the term of this patent is extended or adjusted under 35 U.S.C. 154(b) by 293 days.

(21) Appl. No.: 17/843,239

(22) Filed: Jun. 17, 2022

(65) Prior Publication Data

US 2023/0143064 A1 May 11, 2023

(30) Foreign Application Priority Data

Nov. 5, 2021 (CN) ......................... 202111304392.7
Jun. 11, 2022 (CN) ......................... 202210656763.6

(51) Int. Cl.
*H04R 9/06* (2006.01)
*H04R 9/02* (2006.01)
*H04R 31/00* (2006.01)

(52) U.S. Cl.
CPC ............... *H04R 9/06* (2013.01); *H04R 9/025* (2013.01); *H04R 31/00* (2013.01)

(58) Field of Classification Search
CPC . H04R 9/06; H04R 9/00; H04R 9/025; H04R 31/00; H04R 1/24; H04R 31/006; H04R 11/02; H02K 33/16; B06B 1/045; A61C 17/3445
See application file for complete search history.

(56) References Cited

U.S. PATENT DOCUMENTS 9,621,015 B2 * 4/2017 Katada .................... H02K 33/16
11,575,302 B2 * 2/2023 Takahashi .............. H02K 33/16
2002/0131609 A1 * 9/2002 Kobayashi ............... H04R 9/00 381/117
2007/0040457 A1 * 2/2007 Shimizu ............. A61C 17/3445 310/15
2011/0198949 A1 * 8/2011 Furuich .................. H02K 33/16 310/25
2013/0342034 A1 * 12/2013 Moon ..................... B06B 1/045 310/25
2014/0054983 A1 * 2/2014 Moon .................... H02K 33/16 310/28
2014/0062224 A1 * 3/2014 Kim ....................... H02K 33/16 310/15
2023/0143064 A1 * 5/2023 Lin .......................... H04R 9/06 381/412

* cited by examiner

*Primary Examiner* — Angelica M McKinney

(57) ABSTRACT

A vibration unit includes a shell with a hollow cavity, a vibration shaft arranged in the hollow cavity and coils, wherein the shell is provided with two elastic support structures located at two ends of the vibration shaft, and at least two permanent magnet rings and at least one magnetic insulator ring are fixed to an outer periphery of the vibration shaft, with each magnetic insulator ring arranged between every two adjacent permanent magnet rings. The coils are fixed on an inner wall of the hollow cavity and located on an outer periphery of each of the permanent magnet rings, wherein a change in a current flowing through each of the coils produces vibration of each of the permanent magnet rings in proportion to the change in the current, which in turn drives the vibration shaft to vibrate in proportion.

9 Claims, 6 Drawing Sheets

VIBRATION UNIT, SPEAKER AND MANUFACTURING METHOD OF THE VIBRATION UNIT

CROSS REFERENCE TO RELATED APPLICATION

This application claims priority benefit of Chinese invent Application No. 202111304392.7, filed on Nov. 5, 2021, and the entire contents of which are incorporated herein by reference.

This application claims priority benefit of Chinese invent Application No. 202210656763.6, filed on Jun. 11, 2022, and the entire contents of which are incorporated herein by reference.

TECHNICAL FIELD

The invention relates to vibration units, in particular to a vibration unit, a speaker and a manufacturing method of the vibration unit.

BACKGROUND

Vibration units in the market can be divided into three categories. The first category uses a motor to drive a rotor to rotate; the vibration frequency is directly related to the speed of the motor and the vibration frequency is difficult to control, so that it is difficult to achieve an accurate vibration frequency effect. Moreover, there is mechanical vibration noise, which cannot synchronize with an audio. The second category uses a moving-coil to drive a vibrating plate to achieve a vibration effect, but the low power of vibration cannot meet product requirements and cannot drive the products with a large weight. The third category uses electromagnetic drive to achieve the vibration effect by elastic sheet suppression, but it still cannot reduce the mechanical noise.

Therefore, it is necessary to develop a vibration unit which can synchronize with an audio and has low mechanical noise.

SUMMARY

Aiming at the above problems existing in the prior art, the present invention provides a vibration unit, a speaker and a manufacturing method of a vibration unit thereof.

The purpose of the present invention is realized by the following technical scheme:

A vibration unit includes a shell with a hollow cavity and a vibration shaft arranged in the hollow cavity, wherein the shell is provided with two elastic support structures located at two ends of the vibration shaft, and at least two permanent magnet rings and at least one magnetic insulator ring are fixed to an outer periphery of the vibration shaft, with each magnetic insulator ring arranged between every two adjacent permanent magnet rings; and the vibration unit further includes coils fixed on an inner wall of the hollow cavity and located on an outer periphery of each of the permanent magnet rings, wherein a change in a current flowing through each of the coils causes magnetic field force at two ends of each of the permanent magnet rings to change, so as to produce vibration of each of the permanent magnet rings in proportion to the change in the current, which in turn drives the vibration shaft to vibrate in proportion. The structure uses two or more permanent magnet rings, so that the vibration effect is improved.

Typically, two ends of the vibration shaft extend to outer ends of the hollow cavity and are fixedly connected to the elastic support structures; each of the elastic support structures includes an elastic sheet and a reinforcing sheet; the elastic sheet has one end fixedly connected to the shell and another end fixedly connected to one end of the reinforcing sheet; and another end of the reinforcing sheet is fixedly connected to each of the two ends of the vibration shaft. The structure uses a thin metal sheet as the elastic sheet, which provides an elastic support effect with small resistance and a long service life.

Typically, each of the elastic support structures further includes rivets used for fixedly connecting the elastic sheet and the reinforcing sheet, and a noise-reduction spacer through which the rivets pass and arranged between the elastic sheet and the reinforcing sheet. The noise-reduction spacer further reduces the noise caused by vibration of the vibration shaft transmitted to the shell through the elastic sheet.

Typically, two ends of the shell are each provided with a clearance recess, which provides a vibration space for one end of the elastic sheet connected to the reinforcing sheet. With the clearance recess arranged inward, the shape of the unit remains as a complete cuboid structure, which is compact overall and aesthetically pleasing and has a high strength.

Typically, the reinforcing sheet is at least three times thicker than the elastic sheet; the center of the elastic sheet is provided with an oval hollow to provide a vibration space for the reinforcing sheet; and a width of a middle section of the reinforcing sheet is smaller than widths of two ends of the reinforcing sheet, so as to form a waist-shaped middle section part and provide a larger free vibration space for the vibration shaft. The reinforcing sheet is thick and not easy to deform, and elastic support is completely performed by the elastic sheet, so as to avoid interference between the reinforcing sheet and the elastic sheet in an elastic deformation process. The oval hollow and the waist-shaped middle section part effectively prevent collision between the reinforcing sheet and the elastic sheet during vibration.

Typically, the shell is of a cuboid structure; the hollow cavity is provided with an upper opening for the coils to be installed into the hollow cavity; a side edge of the upper opening is provided with a plurality of notches for passage of wires of the coils; an installation side recess for embedded installation of a printed circuit board (PCB) is provided at an outer side of the notches; and an outer side of the PCB is provided with electrical contacts to connect the wires. The upper opening facilitates installation of the coil; and the installation side recess facilitates embedding of the PCB into the cuboid structure, thereby maintaining a cuboid shape and providing an appealing appearance.

Typically, a bottom of the clearance recess is provided with an anti-collision spacer corresponding to positions of the rivets; and the vibration shaft is provided with snap rings located at outer ends of the permanent magnet rings. The anti-collision spacer can prevent the rivet and the shell from being damaged in extreme circumstances; and the snap ring is convenient for the installation of the permanent magnet rings.

Typically, the vibration shaft is a copper shaft, the quantity of the permanent magnet rings is three, the quantity of the at least one magnetic insulator ring is two, the quantity of the coils is two, and the coils are each located on an outer periphery of one respective magnetic insulator ring; the two coils are connected in series with each other, and ends with the same name are connected together; and the magnetic insulator rings are made of plastics, and adjacent ends of the permanent magnet rings are of the same polarity. The structure is provided with the two coils generating magnetic fields in opposite directions; and the coils are kept at a distance from each other, thereby generating a radial electromagnetic field extending in a direction of a plane (that is, a direction perpendicular to an axial direction of the vibration shaft) at a gap between the coils. Permanent magnet rings with the same polarity are added at two ends of the permanent magnet ring located in a middle position on the vibration shaft, so that the magnetic field extends and is enhanced radially to form a radial permanent magnet field; and a direction of the radial electromagnetic field is opposite to a direction of the radial permanent magnetic field. When a varying current passes through the coils, the vibration shaft will be caused to vibrate in proportion. Because radial extension of the magnetic field can increase strength of the magnetic field, the vibration unit can be used for a large current input, thus forming a vibration output with a higher power (that is, high power electric energy is converted into mechanical energy). The vibration shaft is made of copper with a relatively high density, and the copper does not conduct magnetism and will also improve potential energy during vibration and improve the vibration effect.

The present invention provides a speaker, which includes an audio bass enhancement aid device, wherein the audio bass enhancement aid device includes the vibration unit described above. The vibration unit with low noise is used to provide better sound quality.

A manufacturing method of the vibration unit of the present invention includes the following assembling steps: sleeving at least two permanent magnet rings and at least one magnetic insulator ring alternately onto a vibration shaft with each magnetic insulator ring arranged between every two adjacent permanent magnet rings, and fixing the rings by snap rings to form a vibration shaft assembly; embedding coils into a hollow cavity from an upper opening of a shell to make the coils coaxial with the shell; passing the vibration shaft into the hollow cavity from one end of the shell; and installing one elastic support structure at each of two ends of the shell and the vibration shaft, wherein

- the above-mentioned steps adopt an automatic assembly mode with an automatic conveying guide rail, with the upper opening of the shell facing up and the steps starting from a feeding position:
- a first station is a feeding station, and the shell is placed on a jig seat;
- at a second station, the coils are put into the upper opening,
- at a third station, the vibration shaft assembly is passed into the hollow cavity of the shell from one side by a pushing mechanism;
- at a fourth station, the two elastic support structures are installed to the two ends of the shell and the vibration shaft, respectively; and
- a fifth station is a discharge station, at which the assembled product is taken out from the jig seat.

The manufacturing method adopts an automatic conveying guide rail, which can enable quick assembly and enhance production capacity.

Generally speaking, compared with the prior art, the present invention has the following beneficial effects. The present invention uses two or more permanent magnet rings, so that the vibration effect is improved. Further, a thin metal sheet is used as the elastic sheet, which provides an elastic support effect with small resistance and a long service life. The noise-reduction spacer further reduces the noise caused by vibration of the vibration shaft transmitted to the shell through the elastic sheet. With the clearance recess arranged inward, the shape of the unit remains as a complete cuboid structure, which is compact overall and aesthetically pleasing and has a high strength. The reinforcing sheet is thick and not easy to deform, and elastic support is completely performed by the elastic sheet, so as to avoid interference between the reinforcing sheet and the elastic sheet in an elastic deformation process. The oval hollow and the waist-shaped middle section part effectively prevent collision between the reinforcing sheet and the elastic sheet during vibration. The upper opening facilitates installation of the coil; and the installation side recess facilitates embedding of the PCB into the cuboid structure, thereby maintaining a cuboid shape, providing an appealing appearance, and also facilitating automatic assembly. The assembly method of the vibration unit of the present invention is suitable for adopting automatic equipment to realize automatic assembly. The vibration unit of the present invention can be widely used in small Bluetooth speakers, electric sports gamepads, electric sports headphones, massage devices, electric toys and other products.

List of reference numerals

| | | | |
|---|---|---|---|
| 10 | Shell | 100 | Hollow cavity |
| 101 | Clearance recess | 102 | Upper opening |
| 103 | Notch | 104 | Installation side recess |
| 109 | Anti-collision spacer | 19 | Self-tapping screw |
| 20 | Vibration shaft | 21 | Permanent magnet ring |
| 22 | Magnetic insulator ring | 28 | Snap ring |
| 29 | Machine screw | 30 | Elastic support structure |
| 31 | Elastic sheet | 311 | Oval hollow |
| 32 | Reinforcing sheet | 321 | Waist-shaped middle section |
| 33 | Rivet | 34 | Noise-reduction spacer |
| 40 | Coil | 50 | PCB |
| 51 | Electrical contact | 99 | Surface sticker |

DETAILED DESCRIPTION

In order to fully understand the technical content of the present invention, the technical scheme of the present invention is further introduced and explained in connection with specific embodiments, but is not limited thereto.

Figure 1:
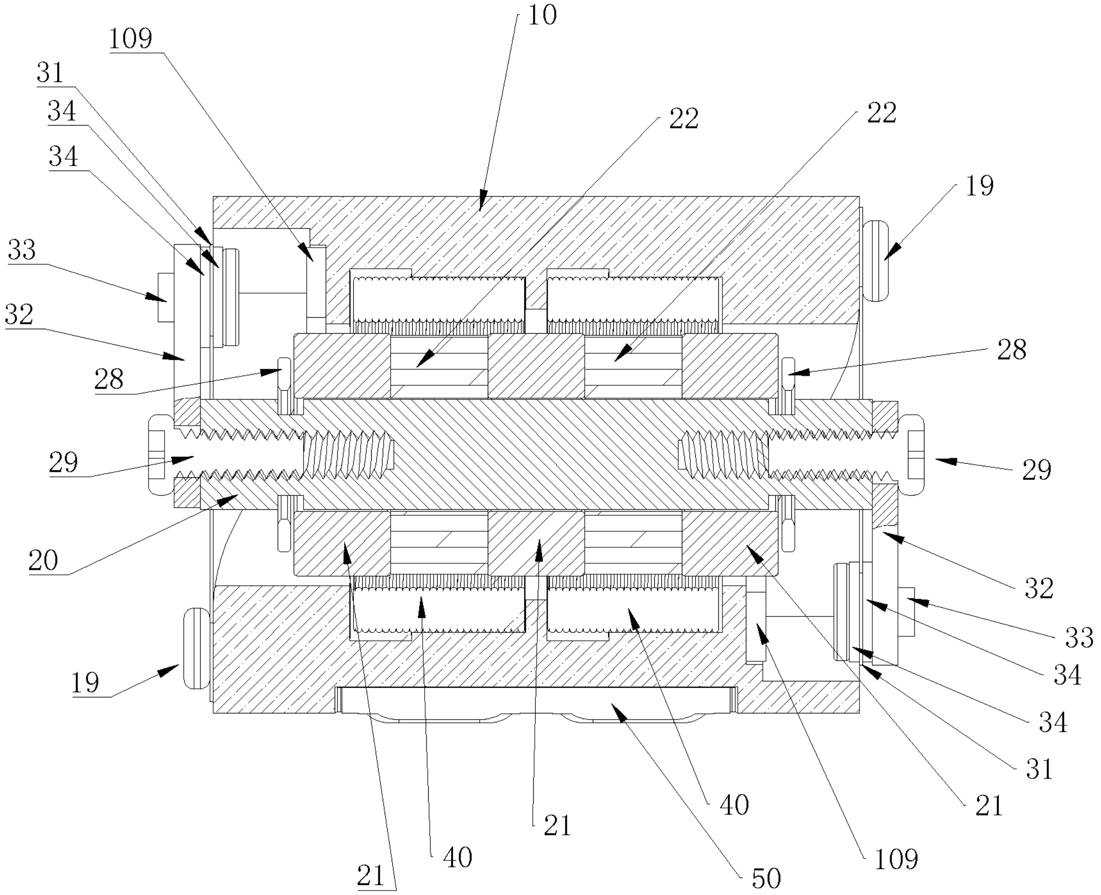
FIG. 1 is a sectional view of a specific embodiment of a vibration unit of the present invention.
Figure 2:
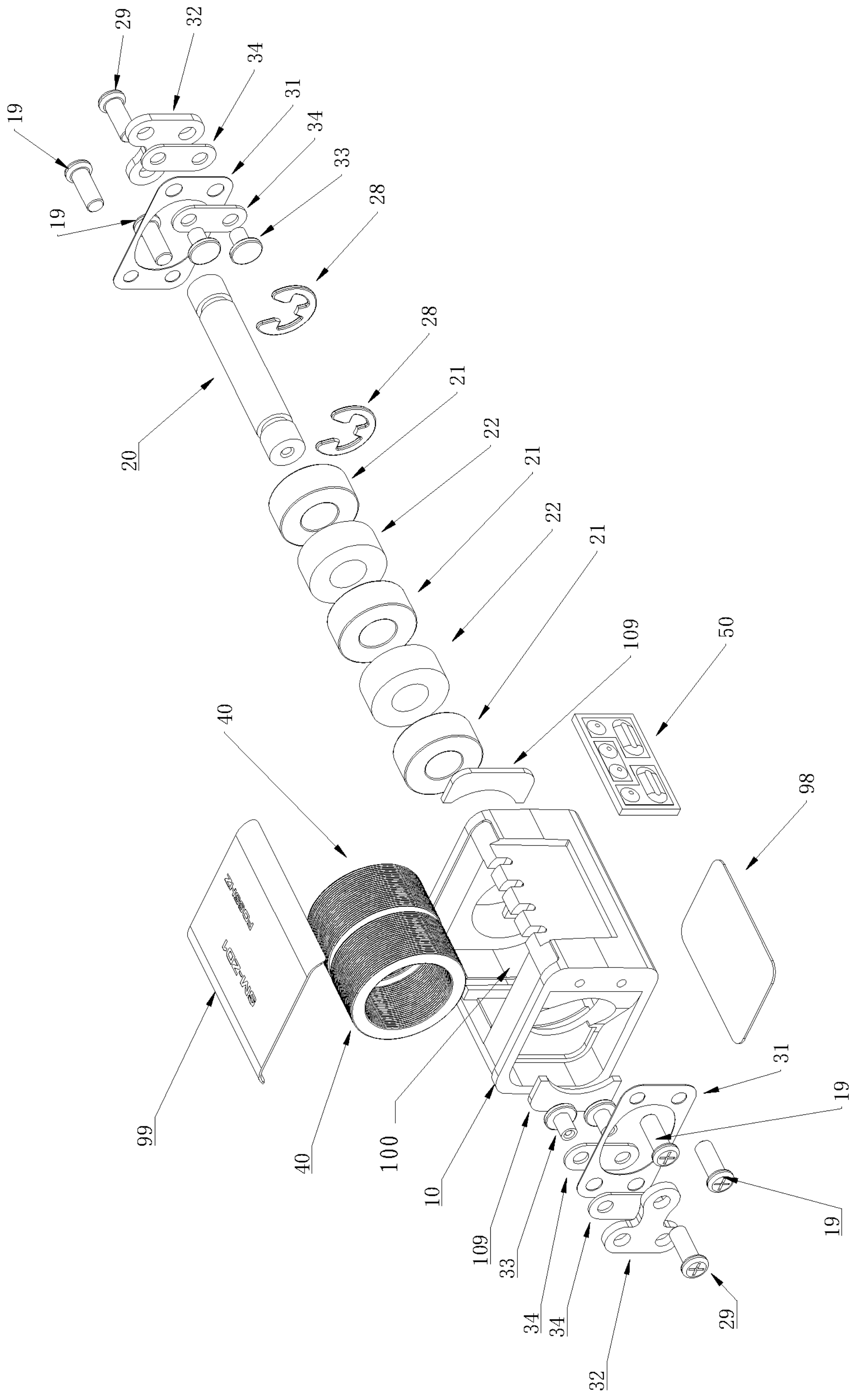
FIG. 2 is an exploded perspective view of the embodiment of FIG. 1.
Figure 3:
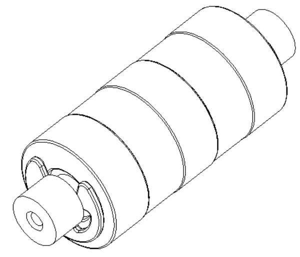
FIG. 3 is a perspective view of a vibration shaft portion of the embodiment of FIG. 1.
Figure 4:
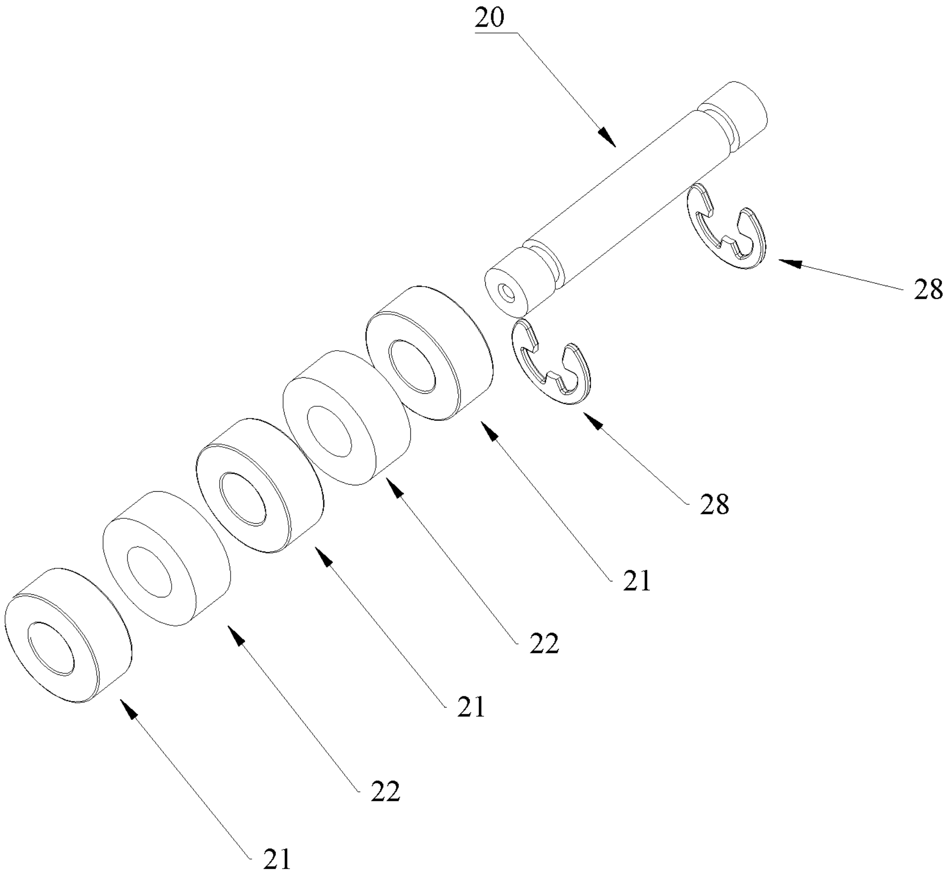
FIG. 4 is an exploded view of FIG. 3.
Figure 5:
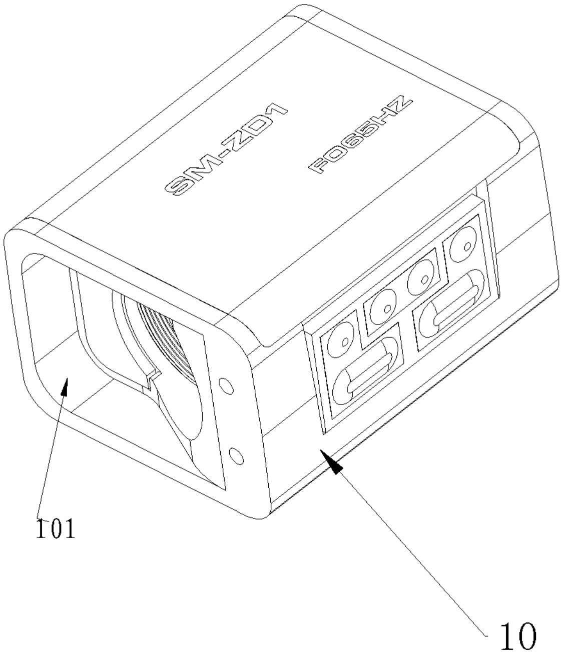
FIG. 5 is a perspective view of a shell of the embodiment of FIG. 1.
Figure 6:
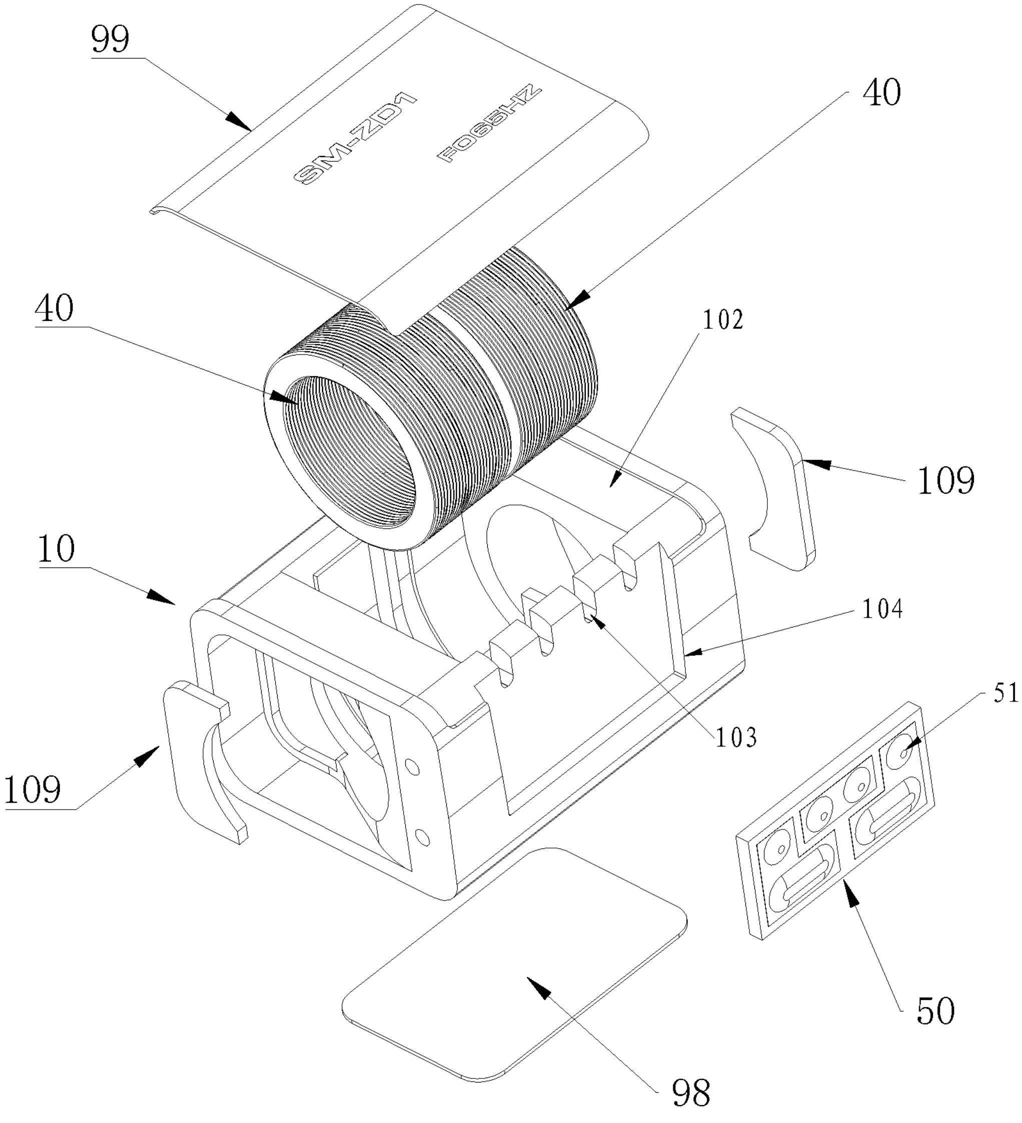
FIG. 6 is an exploded view of FIG. 5.
Figure 7:
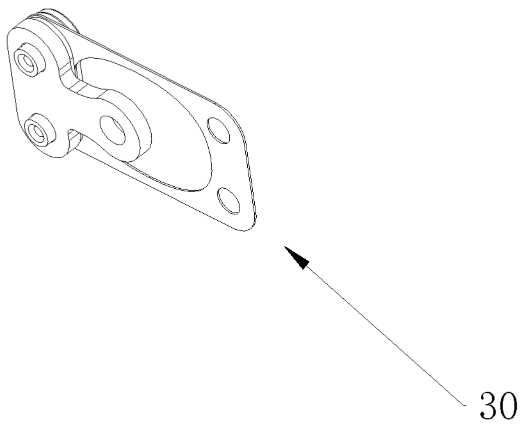
FIG. 7 is a perspective view of an elastic support structure of the embodiment of FIG. 1.
Figure 8:
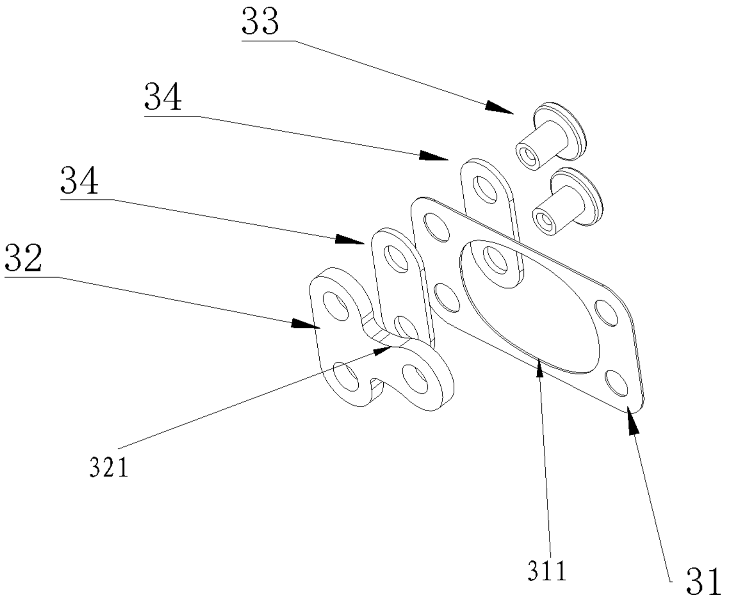
FIG. 8 is an exploded view of FIG. 7.

According to the embodiment shown in FIGS. 1-8, a vibration unit includes a shell 10 with a hollow cavity 100 and a vibration shaft 20 arranged in the hollow cavity 100. The shell 10 is provided with two elastic support structures 30 located at two ends of the vibration shaft 20. Three permanent magnet rings 21 and two magnetic insulator rings 22 each arranged between two adjacent permanent magnet rings 21 are fixed to an outer periphery of the vibration shaft 20. The vibration unit further includes coils 40 fixed on an inner wall of the hollow cavity 100 and located on an outer periphery of each of the permanent magnet rings 21, wherein a change in a current flowing through each of the coils 40 causes magnetic field force at two ends of each of the permanent magnet rings 21 to change, so as to produce vibration of each of the permanent magnet rings 21 in proportion to the change in the current, which in turn drives the vibration shaft 20 to vibrate in proportion. The structure uses two or more permanent magnet rings 21, so that the vibration effect is improved.

More specifically, two ends of the vibration shaft 20 extend to outer ends of the hollow cavity and are fixedly connected to the elastic support structures 30; each of the elastic support structures 30 includes an elastic sheet 31 and a reinforcing sheet 32; the elastic sheet 31 has one end fixedly connected to the shell 10 (by self-tapping screws 19 in this embodiment) and another end fixedly connected to one end of the reinforcing sheet 32; and another end of the reinforcing piece 32 is fixedly connected to each of the two ends of the vibration shaft 20 (by a machine screw 29 in this embodiment). The structure uses a thin metal sheet as the elastic sheet, which provides an elastic support effect with small resistance and a long service life.

More specifically, each of the elastic support structures 30 further includes rivets 33 used for fixedly connecting the elastic sheet 31 and the reinforcing sheet 32, and a noise-reduction spacer 34 through which the rivets 33 pass and arranged between the elastic sheet 31 and the reinforcing sheet 32. The noise-reduction spacer 34 further reduces the noise caused by vibration of the vibration shaft 20 transmitted to the shell 10 through the elastic sheet 31.

More specifically, two ends of the shell 10 are each provided with a clearance recess 101, which provides a vibration space for one end of the elastic sheet 31 connected to the reinforcing sheet 32. With the clearance recess 101 arranged inward, the shape of the unit remains as a complete cuboid structure, which is compact overall and aesthetically pleasing and has a high strength. In this embodiment, the clearance recess 101 is of a sloped structure, that is, an inner side where the rivet 33 is located is the deepest, and the position where one end of the elastic sheet 31 is fixedly connected to the shell 10 is the shallowest.

More specifically, the reinforcing sheet 32 is at least three times thicker than the elastic sheet 31; the center of the elastic sheet 31 is provided with an oval hollow 311 to provide a vibration space for the reinforcing sheet 32; and a width of a middle section of the reinforcing sheet 32 is smaller than widths of two ends of the reinforcing sheet, so as to form a waist-shaped middle section part 321 and provide a larger free vibration space for the vibration shaft 20. The reinforcing sheet 32 is thick and not easy to deform, and elastic support is completely performed by the elastic sheet 31, so as to avoid interference between the reinforcing sheet and the elastic sheet in an elastic deformation process. The oval hollow 311 and the waist-shaped middle section part 321 effectively prevent collision between the reinforcing sheet and the elastic sheet during vibration.

More specifically, the shell 10 is of a cuboid structure; the hollow cavity 100 is provided with an upper opening 102 for the coils 40 to be installed into the hollow cavity; a side edge of the upper opening 102 is provided with a plurality of notches 103 for passage of wires of the coils 40; an installation side recess 104 for embedded installation of a PCB 50 is provided at an outer side of the notches 103; and an outer side of the PCB 50 is provided with electrical contacts 51 to connect the wires. The upper opening 102 facilitates installation of the coils 40; and the installation side recess 104 facilitates embedding of the PCB 50 into the cuboid structure, thereby maintaining a cuboid shape and providing an appealing appearance. After assembly is completed, a surface sticker 99 is installed on the upper opening 102 to cover the upper opening 102. The bottom of the shell 10 is further provided with a bottom sticker 98.

More specifically, a bottom of the clearance recess 101 is provided with an anti-collision spacer 109 corresponding to positions of the rivets; and the vibration shaft 20 is provided with snap rings 28 located at outer ends of the permanent magnet rings 21. The anti-collision spacer 109 can prevent the rivet 33 and the shell 10 from being damaged in extreme circumstances; and the snap ring 28 is convenient for the installation of the permanent magnet rings 21.

More specifically, the vibration shaft 20 is a copper shaft, the quantity of the permanent magnet rings 21 is three, the quantity of the at least one magnetic insulator ring 22 is two, the quantity of the coils 40 is two, and the coils are each located on an outer periphery of one respective magnetic insulator ring 22; the two coils 40 are connected in series with each other, and ends with the same name are connected together, and the magnetic insulator rings 22 are made of plastics, and adjacent ends of the permanent magnet rings 21 are of the same polarity. The structure is provided with the two coils generating magnetic fields in opposite directions; and the coils are kept at a distance from each other, thereby generating a radial electromagnetic field extending in a direction of a plane (that is, a direction perpendicular to an axial direction of the vibration shaft) at a gap between the coils. Permanent magnet rings with the same polarity are added at two ends of the permanent magnet ring located in a middle position on the vibration shaft, so that the magnetic field extends and is enhanced radially to form a radial permanent magnet field; and a direction of the radial electromagnetic field is opposite to a direction of the radial permanent magnetic field. When a varying current passes through the coils, the vibration shaft will be caused to vibrate in proportion. Because radial extension of the magnetic field can increase strength of the magnetic field, the vibration unit can be used for a large current input, thus forming a vibration output with a higher power (that is, high power electric energy is converted into mechanical energy). The vibration shaft is made of copper with a relatively high density, and the copper does not conduct magnetism and will also improve potential energy during vibration and improve the vibration effect.

The present invention further discloses a speaker, which includes an audio bass enhancement aid device, wherein the audio bass enhancement aid device includes the vibration unit described above. The vibration unit with low noise is used to provide better sound quality.

The present invention further discloses a manufacturing method of the vibration unit, which includes the following assembling steps: sleeving at least two permanent magnet rings and at least one magnetic insulator ring alternately onto a vibration shaft with each magnetic insulator ring arranged between every two adjacent permanent magnet rings, and fixing the rings by snap rings to form a vibration shaft assembly, embedding coils into a hollow cavity from an upper opening of a shell to make the coils coaxial with the shell; passing the vibration shaft into the hollow cavity from one end of the shell; and installing one elastic support structure at each of two ends of the shell and the vibration shaft, wherein the above-mentioned steps adopt an automatic assembly mode with an automatic conveying guide rail, with the upper opening of the shell facing up and the steps starting from a feeding position:

a first station is a feeding station, and the shell is placed on a jig seat;

at a second station, the coils are put into the upper opening;

at a third station, the vibration shaft assembly is passed into the hollow cavity of the shell from one side by a pushing mechanism;

at a fourth station, the two elastic support structures are installed to the two ends of the shell and the vibration shaft, respectively; and a fifth station is a discharge station, at which the assembled product is taken out from the jig seat.

The manufacturing method adopts an automatic conveying guide rail, which can enable quick assembly and enhance production capacity.

To sum up, the present invention uses two or more permanent magnet rings, so that the vibration effect is improved. Further, a thin metal sheet is used as the elastic sheet, which provides an elastic support effect with small resistance and a long service life. The noise-reduction spacer further reduces the noise caused by vibration of the vibration shaft transmitted to the shell through the elastic sheet. With the clearance recess arranged inward, the shape of the unit remains as a complete cuboid structure, which is compact overall and aesthetically pleasing and has a high strength. The reinforcing sheet is thick and not easy to deform, and elastic support is completely performed by the elastic sheet, so as to avoid interference between the reinforcing sheet and the elastic sheet in an elastic deformation process. The oval hollow and the waist-shaped middle section part effectively prevent collision between the reinforcing sheet and the elastic sheet during vibration. The upper opening facilitates installation of the coil; and the installation side recess facilitates embedding of the PCB into the cuboid structure, thereby maintaining a cuboid shape, providing an appealing appearance, and also facilitating automatic assembly. The assembly method of the vibration unit of the present invention is suitable for adopting automatic equipment to realize automatic assembly. The vibration unit of the present invention can be widely used in small Bluetooth speakers, electric sports gamepads, electric sports headphones, massage devices, electric toys and other products.

The above embodiments are used merely to further explain the technical content of the present invention, so that readers can understand the present invention more easily, and it is not intended that the embodiments of the present invention are limited thereto, and any technical extension or re-creation according to the present invention is protected by the present invention. The scope of protection of the present invention is subject to the appended claims.

What is claimed is:

1. A vibration unit, comprising a shell with a hollow cavity and a vibration shaft arranged in the hollow cavity, wherein the shell is provided with two elastic support structures located at two ends of the vibration shaft, and at least two permanent magnet rings and at least one magnetic insulator ring are fixed to an outer periphery of the vibration shaft, with each magnetic insulator ring arranged between every two adjacent permanent magnet rings; and further comprising coils fixed on an inner wall of the hollow cavity and located on an outer periphery of each of the permanent magnet rings, wherein a change in a current flowing through each of the coils causes magnetic field force at two ends of each of the permanent magnet rings to change, so as to produce vibration of each of the permanent magnet rings in proportion to the change in the current, which in turn drives the vibration shaft to vibrate in proportion.

2. The vibration unit of claim 1, wherein the two ends of the vibration shaft extend to outer ends of the hollow cavity and are fixedly connected to the elastic support structures; each of the elastic support structures comprises an elastic sheet and a reinforcing sheet; the elastic sheet has one end fixedly connected to the shell and another end fixedly connected to one end of the reinforcing sheet; and another end of the reinforcing sheet is fixedly connected to each of the two ends of the vibration shaft.

3. The vibration unit of claim 2, wherein each of the elastic support structures further comprises rivets used for fixedly connecting the elastic sheet and the reinforcing sheet, and a noise-reduction spacer through which the rivets pass and arranged between the elastic sheet and the reinforcing sheet.

4. The vibration unit of claim 3, wherein two ends of the shell are each provided with a clearance recess, which provides a vibration space for one end of the elastic sheet connected to the reinforcing sheet.

5. The vibration unit of claim 4, wherein a bottom of the clearance recess is provided with an anti-collision spacer corresponding to positions of the rivets; and the vibration shaft is provided with snap rings located at outer ends of the permanent magnet rings.

6. The vibration unit of claim 1, wherein the reinforcing sheet is at least three times thicker than the elastic sheet; a center of the elastic sheet is provided with an oval hollow to provide a vibration space for the reinforcing sheet; and a width of a middle section of the reinforcing sheet is smaller than widths of two ends of the reinforcing sheet, so as to form a waist-shaped middle section part and provide a larger free vibration space for the vibration shaft.

7. The vibration unit of claim 1, wherein the shell is of a cuboid structure; the hollow cavity is provided with an upper opening for the coils to be installed into the hollow cavity; a side edge of the upper opening is provided with a plurality of notches for passage of wires of the coils; an installation side recess for embedded installation of a printed circuit board (PCB) is provided at an outer side of the notches; and an outer side of the PCB is provided with electrical contacts to connect the wires.

8. The vibration unit of claim 1, wherein the vibration shaft is a copper shaft, the quantity of the permanent magnet rings is three, the quantity of the at least one magnetic insulator ring is two, the quantity of the coils is two, and the coils are each located on an outer periphery of one respective magnetic insulator ring; the two coils are connected in series with each other; and the magnetic insulator rings are made of plastics, and adjacent ends of the permanent magnet rings are of the same polarity.

9. A speaker, comprising an audio bass enhancement aid device, wherein the audio bass enhancement aid device comprises the vibration unit of claim 1.

* * * * *